United States Patent [19]

Zagar et al.

[11] 4,416,697
[45] Nov. 22, 1983

[54] METHOD FOR PREHEATING CEMENT CLINKER RAW MATERIALS

[75] Inventors: Steven J. Zagar, Milwaukee; James L. Shy, East Troy, both of Wis.

[73] Assignee: Allis-Chalmers Corporation, Milwaukee, Wis.

[21] Appl. No.: 418,714

[22] Filed: Sep. 16, 1982

[51] Int. Cl.$^3$ .............................................. C04B 7/44
[52] U.S. Cl. ...................................... 106/100; 432/13
[58] Field of Search ........................... 106/100; 432/13

[56] References Cited

U.S. PATENT DOCUMENTS

| | | | |
|---|---|---|---|
| 3,139,463 | 6/1964 | Wuhrer | 106/100 |
| 3,203,681 | 8/1965 | Rosa et al. | 106/100 |
| 3,914,098 | 10/1975 | Kano et al. | 432/106 |
| 3,973,980 | 8/1976 | Rohrbach et al. | 106/100 |
| 4,256,502 | 3/1981 | Lovichi et al. | 106/100 |

Primary Examiner—James Poer
Attorney, Agent, or Firm—Timothy R. Conrad

[57] ABSTRACT

A method is disclosed for heat treating raw material components of a cement clinker prior to admitting the components to a reactor for sintering the components to form the clinker. A calcareous component of the raw material is preheated with a hot gas flow and admitted to a furnace in a calcining stage. Fuel combusted in the furnace heats the calcareous component to a calcination reaction temperature and calcines the component. The calcined component is transferred to a furnace in a superheating stage where a fuel is combusted to further heat the component beyond a sintering temperature at which a calcined component and an argillaceous component sinter to form cement clinker. The superheated calcareous component is transferred to a sintering reactor. Hot gas from the furnace in the sintering stage is passed to the furnace in the calcining stage to augment the heat in the calcining stage furnace. A flow of hot air from a cement cooler is passed to a second exchanger to preheat and dehydrate an argillaceous component of the raw material. The dehydrated argillaceous component is transferred to the sintering reactor and sintered with the superheated calcareous component with the sensible heat of the calcareous component supplementing the heat needed to maintain sintering and the reactor providing only the heat as needed to augment the heat of the calcareous component.

9 Claims, 1 Drawing Figure

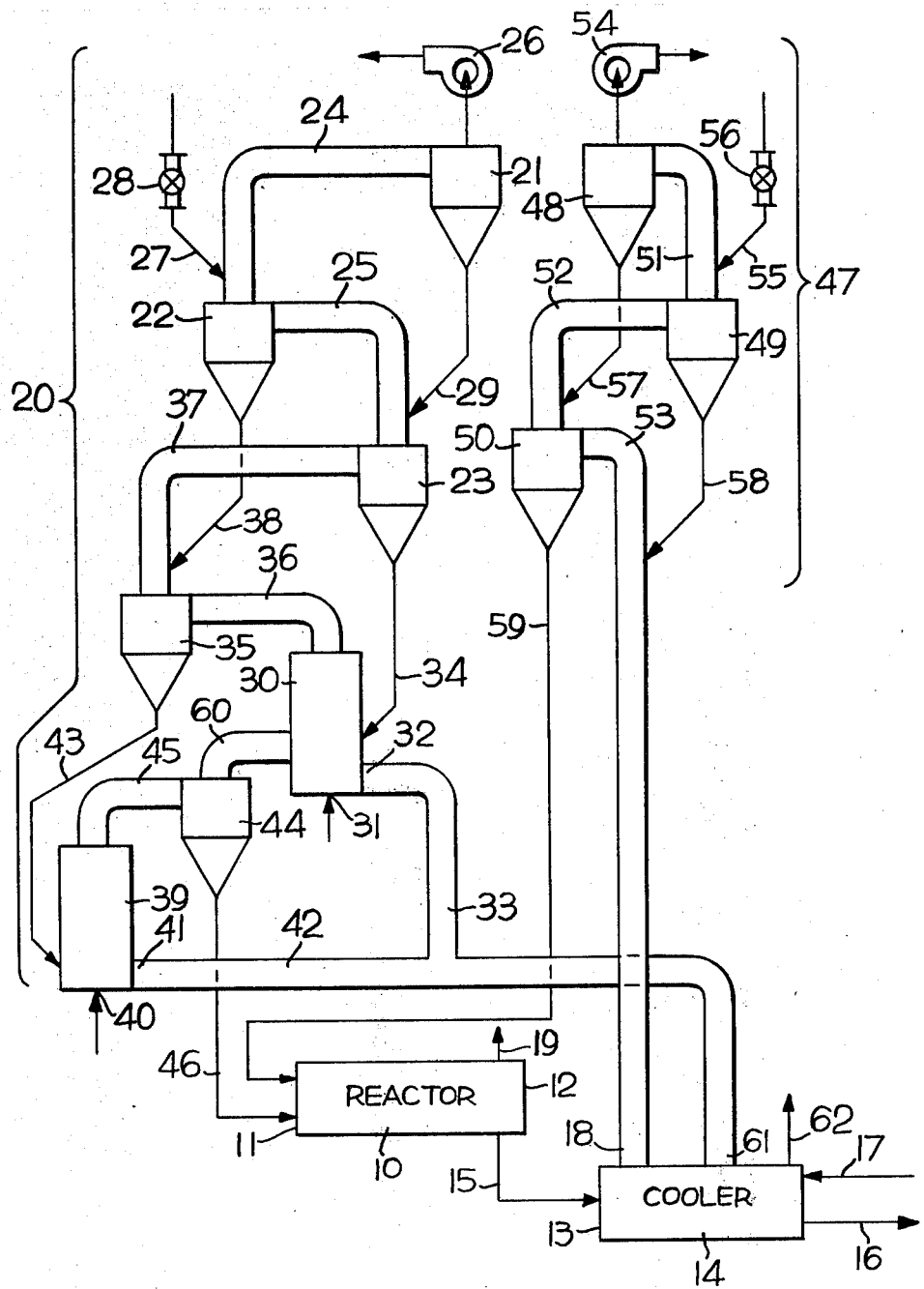

METHOD FOR PREHEATING CEMENT CLINKER RAW MATERIALS

CROSS REFERENCE TO RELATED PATENT APPLICATION

This application discloses a method for heat treating cement clinker raw materials which is related to our copending and commonly assigned U.S. patent application Ser. No. 418,703, entitled "Method for Heat Treating Cement Raw Materials" filed concurrently with this application.

BACKGROUND OF THE INVENTION

1. Field of the Invention

This invention relates to a method of heat treating raw material components for the production of cement clinker. More particularly, this invention relates to a method of separately heat treating components of the raw material.

2. Description of the Prior Art

Raw material for the production of cement, such as Portland cement, is comprised of a pulverulent mixture of a calcareous component (such as limestone) as a source of calcium oxide, and an argillaceous component (such as clay or a mixture of clay and sand) as a source of oxides of aluminum, silicon, iron and other minerals. The raw materials are processed into cement clinker by drying, dehydrating, calcining and sintering the materials. Calcination is a reaction during which carbon dioxide within the calcareous component (in the form of calcium carbonate) is liberated leaving a free lime which sinters with the dehydrated argillaceous material to form clinker. The calcination reaction is endothermic while the sintering reaction is exothermic.

Historically, the processes for making a cement clinker have been performed almost exclusively in rotary kilns. The raw material is fed to an inlet end of the kiln and progresses to a discharge end. A burner positioned at the discharge end supplies the necessary heat to maintain the process reactions as the material moves through the kiln. Generally, the burner was required to generate at least 800 kcal per kg of clinker produced for a dry process.

Under historical processes, in order to obtain higher output capacities, the kilns were made progressively larger. This practive resulted in various inefficiencies such as increased radiation losses from the kiln shell and short life of the kiln's refractory lining. Additionally, the practice of carrying out the total cement manufacturing process in the kiln had the inherent inefficiency that heat generated by the burner was being generated in a location away from the greatest heat need. The burner was generating heat in the region of the kiln where the sintering reaction (an exothermic reaction) was occurring while the generated heat was needed in the region of the kiln where the calcination reaction (the endothermic) reaction was occurring.

Cognizant of the above, as well as other problems associated with the complete manufacture of cement in a kiln, cement manufacturers developed processes by which a substantial portion of the heat treatment processes, including the calcination reaction, occurred prior to the material being fed into the kiln. Consequently, the kiln needed to generate only the amount of heat needed to maintain the sintering reaction.

Such heat treatment processes comprised a suspended heat exchanger in material flow communication with the inlet of the kiln. The heat exchanger typically comprised a plurality of series connected cyclones for preheating and dehydrating a pulverulent mixture of the raw material and a calcining furnace, or the like, for receiving the dehydrated material and at least partially calcining the mixture prior to admitting the mixture to the kiln. Examples of such processes may be found in U.S. Pat. No. 3,914,098 to Kano et al, dated Oct. 21, 1975.

While such suspension-type preheating processes advanced the art of cement manufacturing, they are limited to the extent they can relieve the kiln of its heating burden. A chief cause of the limitation is, if the raw materials are heated to too great an extent in the preheater, the materials begin to undergo a phase change where the materials become adhesive and adhere to the preheater equipment. The adherence interferes with both material and gas flow through the equipment.

The desire to relieve the kiln of its heating burden is a continuous one. Additionally, the desire to heat as high as possible in the suspension preheaters is particularly desirable in processes where the clinker is to be sintered in a reactor other than a rotary kiln (such as in an electric arc furnace) where the costs of generating the heat in the reactor are particularly high. Such a process may be as described in U.S. Pat. No. 3,203,681 to Rosa et al, dated Aug. 31, 1965.

We have determined separately heat treating the raw material components of the cement clinker can be accomplished in a suspension-type preheater with at least one of the components heated to a temperature in excess of the temperature needed to initiate sintering and without the troublesome phase change noted above. Accordingly, the raw material component supplies at least a portion of the heat needed to maintain sintering when mixed with the other components. The sintering reactor is required only to augment the heat of the raw material component as needed.

Previously known processes involving at least a partial heat treatment of separate raw materials may be found in the following U.S. Pat. Nos.: 3,973,980 to Rohrbach et al, dated Aug. 10, 1976; 4,256,502 to Lovichi et al, dated Mar. 17, 1981 and 3,139,463 to Wuhrer, dated June 30, 1964.

Rohrbach teaches preheating a clay component in a preheater with waste gas from a kiln. A limestone component is fed to a separate preheater to which a flow of hot gas is supplied to preheat the limestone. The preheated clay and limestone are fed past burners which calcine the limestone with the mixed calcined limestone and clay fed to a kiln for sintering. The process as taught by Rohrbach reduces the heat requirement of the kiln to 100 kcal per kg of clinker.

Wuhrer teaches drying a clay component with waste gas from a kiln. The dry clay is mixed with lime and the mixture is preheated with hot air from a cement clinker cooler. The preheated mixture is fed to a kiln for sintering. Lovichi discloses a process where shale is precalcined in a separate preheater and mixed with a preheated mixture of clay and limestone from a preheater with the mixture of calcined shale, clay and limestone fed to a kiln for sintering.

In each of the above described processes, the extent to which the sintering reactor (the kilns in the disclosed processes) can be relieved of a heating burden is limited. The amount of heat which can be added to the material prior to the admission to the kiln is limited by the temperatures at which the mixture enters a phase where the material is adhesive. Practically, this temperature is the temperature at which the calcareous component calcines.

OBJECTS AND SUMMARY OF THE INVENTION

It is an object of the present invention to provide a method for heat treating raw material components of cement clinker. It is a further object of the present invention to provide a method of separately heat treating components of the raw material with one of the components heated to a temperature greater than the sintering temperature of the components.

According to a preferred embodiment of the present invention, there is provided an installation for the heat treatment of raw material components of cement clinker prior to admitting the material to a sintering reactor for sintering the material to a clinker. A cooler is provided for receiving hot clinker from the reactor and cooling the clinker with air to form cool clinker and a waste gas of hot air.

Two heat exchangers are provided with a first heat exchanger comprising a preheat stage, a calcining stage and a superheat stage. The calcining and superheat stages are each provided with a furnace operable to combust a fuel with hot air from the cooler.

A calcareous component of the raw material is fed to the preheat stage and preheated and dehydrated. The preheated calcareous component is next fed to the calcining stage and calcined in the presence of the combustion products of the fuel and hot air. The combustion products are exhausted from the calcining stage to the preheat stage to preheat material in the preheat stage.

The calcined material is fed to the superheat stage and heated beyond the sintering temperature of the components in the presence of the combustion products of the fuel and hot air. The superheated material is fed to a sintering reactor. The combustion products are exhausted from the superheat stage and flow to the furnace of the calcining stage to augment the heat of the combustion products of the calcining stage.

A flow of hot air from the cooler is passed to a second heat exchanger which is supplied with a flow of an argillaceous component of the raw material. The hot air heats the argillaceous component to a temperature less than an eutectic temperature at which the argillaceous component experiences a phase change and becomes adhesive.

The heated argillaceous component is fed to the sintering reactor and sintered with the superheated calcareous component. A substantial portion of the heat needed to maintain the sintering reaction is provided by the sensible heat of the calcareous component with the reactor called upon to only augment the heat as may be necessary.

BRIEF DESCRIPTION OF THE DRAWING

The drawing, consisting of a single FIGURE, is a schematic showing of an installation for the production of cement clinker.

DESCRIPTION OF THE PREFERRED EMBODIMENT

Referring to the drawing, a reactor 10 (such as a rotary kiln or arc furnace) is shown having an inlet end 11 operable to receive unmixed flows of heat treated particulate matter and a discharge end 12 connected in material flow communication with an inlet end 13 of a cooler 14 (such as a stoker cooler) by means of a material conduit 15. Cooler 14 is provided with a material discharge conduit 16, an air inlet 17 and a hot air outlet 18. Reactor 10 is provided with a gas discharge outlet 19.

A first suspension heat exchanger 20 is provided as having a preheat stage comprising three series connected cyclones 21, 22 and 23 with a gas outlet of second cyclone 22 connected in gas flow communication with an inlet of first cyclone 21 by a duct 24 and with a gas outlet of third cyclone 23 connected in gas flow communication with an inlet of second cyclone 22 by a duct 25. A first exhaust fan 26 is provided in flow communication with a gas outlet of cyclone 21. A first material feed conduit 27 connects a rotary feeder 28 with duct 24. A material conduit 29 connects cyclone 21 with duct 25.

The first suspension heat exchanger 20 is further provided with a calcining stage comprising a first suspension furnace 30 having a fuel inlet 31 and an air inlet 32 connected to air outlet 61 of cooler 14 by a conduit 33. A material conduit 34 connects furnace 30 with cyclone 23. A fourth cyclone 35 is provided having a gas inlet connected in flow communication with a gas outlet of furnace 30 by a duct 36. A duct 37 connects a gas outlet of fourth cyclone 35 with an inlet of third cyclone 23. A material conduit 38 connects second cyclone 22 with duct 37.

First suspension heat exchanger is also provided with a superheating stage having a second suspension furnace 39 with a fuel inlet 40 and an air inlet 41 connected in gas flow communication with conduit 33 by gas conduit 42. A material conduit 43 connects second furnace 39 with fourth cyclone 35. The superheating stage also includes a fifth cyclone 44 having an inlet connected with an outlet of second furnace 39 by a duct 45. A first material discharge conduit 46 connects fifth cyclone 44 with inlet end 11 of reactor 10. A duct 60 connects a gas outlet of fifth cyclone 44 with a gas inlet of first furnace 30.

A second heat exchanger 47 is provided as comprising three series-connected cyclones 48, 49 and 50 with a gas outlet of seventh cyclone 49 connected in gas flow communication with an inlet of sixth cyclone 48 by a duct 51 and with a duct 52 connecting a gas outlet of eighth cyclone 50 with an inlet of seventh cyclone 49. A duct 53 is provided connecting a gas outlet 18 near the material inlet end of cooler 14 with an inlet of eighth cyclone 50. A second exhaust fan 54 is provided in flow communication with a gas outlet of sixth cyclone 48. A second material feed conduit 55 connects rotary feeder 56 with duct 51. A material conduit 57 connects sixth cyclone 48 with duct 52 and a material conduit 58 connects seventh cyclone 49 with duct 53. A second material discharge conduit 59 connects eighth cyclone 50 with the inlet end 11 of reactor 10.

In the operation of the invention to produce cement clinker, hot air issuing from cooler 14 is passed through duct 53 to cyclone 50 and through conduits 33 and 42 to air inlets 32 and 41 of furnaces 30 and 39, respectively. Within second furnace 39 the admitted air is combusted with a fuel (such as pulverized coal) admitted through fuel inlet 40 to produce a hot product gas. The hot product gas flows sequentially to cyclone 44 and first furnace 30 through dusts 45 and 60.

Within first furnace 30, air admitted through inlet 32 is combusted with a fuel admitted through inlet 31 to produce a hot product gas which is mixed with the hot product gas admitted to furnace 30 through duct 60. The mixture of product gases flows from first furnace 30 through duct 36 and flows sequentially through cyclones 35, 23, 22 and 21 through ducts 37, 25 and 24, respectively. First exhaust fan 26 draws the gas from cyclone 21 to final treatment (such as dust collection and quenching) prior to discharge to the atmosphere.

The hot air from cooler 14 flowing through duct 53 flows sequentially through cyclones 50, 49 and 48 by means of connecting ducts 52 and 51. Second exhaust fan 54 draws the gas from cyclone 48 to final treatment.

A calcareous pulverulent raw material component of the cement clinker (such as limestone) is supplied from a source (not shown) and discharged through feeder 28 and conduit 27 into duct 24. Within duct 24, the calcareous material is entrained within the gas flow within the duct 24 and flow to cyclone 21 with the gas heating the material as it flows. Within cyclone 21, the heated material is separated from the flow with the material passing from cyclone 21 through conduit 29 to duct 25 where the material is again entrained and further heated by gas flow through duct 25 flowing to cyclone 22. In cyclone 22, the further heated material is separated from the gas flow and passed to duct 37 through conduit 38 with the material being entrained and yet further heated within duct 37 to dehydrate the material as it flows with the gas to cyclone 23. Within cyclone 23, the material is separated from the gas and flows through conduit 34 to first furnace 30.

Within first furnace 30, the material is entrained within the mixture of hot product gases and heated to a calcination reaction temperature at which an endothermic process occurs generating a free lime from the calcareous material. The calcination reaction continues as the material flows within furnace 30 and duct 36 to cyclone 35. The material separated from the gas within cyclone 35 is nearly completely calcined and passed to second furnace 39 through conduit 43.

Within second furnace 39 the material is entrained within the hot product gas and superheated to a temperature not less than a sintering temperature at which reaction between the lime and preheated argillaceous material begin to form cement clinker. The superheated material is separated from the gas in cyclone 44 and passed to reactor 10 through conduit 46.

An argillaceous pulverulent raw material component (such as clay or a mixture of clay and sand) is supplied from a source (not shown) and discharged through feeder 56 and conduit 55 into duct 51 of the second heat exchanger 47. The material is entrained within the gas flow in duct 51 and flows to cyclone 48 with the gas heating the material. Within cyclone 48 the heated material is separated from the gas and passed through conduit 57 to duct 52 where the material is again entrained within a gas flow and further heated. The further heated material is separated from the gas within cyclone 49 and passed through conduit 58 to duct 53 where the material is yet further heated and dehydrated as it is entrained within gas flowing to cyclone 50. The material is separated from the gas within cyclone 50 and passed through second discharge conduit 59 to the inlet end 11 of reactor 10. Within second heat exchanger, the argillaceous material is heated to a temperature sufficient to preheat and dehydrate the material but not in excess of an eutectic temperature above which the material is sufficiently liquid as to collect within and clog conduits such as conduit 59.

In order to properly preheat the argillaceous component, the hot air flowing through duct 53 is taken from the inlet end of cooler 14 through outlet 18 since the air within the cooler 14 is hottest at the inlet end. It will be appreciated that the temperature of the air within duct 53 may be increased in any number of ways including providing duct 53 with a burner.

Within reactor 10, the preheated argillaceous material and the superheated calcareous material are blended and sintered to form a hot cement clinker. The thermal energy needed to complete the sintering of the materials is supplied by the sensible heat of the superheated calcareous material and augmented by a heat source, not shown, within reactor 10 (such as a burner). During the sintering of the materials, gas which may be produced (such as vaporized alkalies) are vented from the reactor through gas outlet 19.

The sintered product, or hot cement clinker, is discharged from the discharge end 12 of reactor 10 and passed through conduit 15 to the inlet end 13 of cooler 14. Air admitted to cooler 14 through air inlet 17 cools the clinker with subsequent heating of the air. The cooled clinker is discharged from the cooler through conduit 16 and the hot air is discharged through gas outlets 18 and 61. Excess air within cooler 14 may be vented through a vent 62.

EXAMPLE

By way of example, for a cement plant to produce a desired output of cooled clinker at a final temperature of 100° C., we have determined that the hot air issuing from cooler 14 through duct 53 will be approximately 1,000° C. and the air discharged through outlet 61 will be approximately 800° C. The air from outlet 61 flows to air inlets 32 and 41 of furnace 30 and 39, respectively. Fuel such as pulverized coal is fed to the first furnace and the second furnace. The calcareous component of pulverulent limestone is fed through feeder 28 at 50° C. and the argillaceous material of pulverulent clay and sand is fed through feeder 56 preferably at a temperature of 60° C. to insure the material is dry.

Under the conditions as described above, the heat released by combusting fuel and 800° C. air within the first furnace 30 is nearly completely used to calcine the limestone within the furnace such that gas flowing from cyclone 35 in duct 37 is at 875° C. and material flowing in conduit 43 to second furnace 39 is approximately 98% calcined and 850° C. Within second furnace 39, the heat released by combusting fuel with the air heats the material to a temperature of 1,200° C. at which the material is completely calcined and above the temperature at which the sintering reaction normally occurs.

The temperature of the gas leaving cyclone 44 through duct 60 is 1,250° C. and the gas flows to first furnace 30 and provides additional heat to calcine the material in furnace 30. The air from cooler 14 from outlet 18 flows through duct 53 at 1,000° C. and, within second heat exchanger 47, heats the argillaceous material to a temperature of 750° C. The heated argillaceous material and superheated calcareous material are fed to reactor 10 where an additional amount of heat equal to about 58 kcal/kg of clinker is added to augment the heat of the superheated calcareous material to effect sintering of the two material flows. The hot clinker is discharged from reactor 10 at a temperature of 1,450° C.

From the foregoing detailed description of the present invention, it has been shown how the objects of the present invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims, such as or may hereafter be, appended hereto.

The embodiments of the invention in which an exclusive property of privilege is claimed are defined as follows:

1. A method for heat treating pulverulent raw material for the production of cement clinker in an installation comprising a first and second heat exchanger; a reactor operable to receive heat treated raw material from said heat exchanger; and a cooler operable to accept a hot cement clinker from said reactor and cool said reactor with a gas to form a cool clinker and a hot waste gas; said first heat exchanger comprising a preheat stage, a calcining stage and a superheating stage with means within said calcining and superheating stages operable to receive a fuel and a gas containing free oxygen and combust said fuel with said gas; said raw material comprising a calcareous component and an argillaceous component; said argillaceous component having an eutectic temperature at which said argillaceous component enters an adhesive phase; said calcareous component having a calcining temperature at which an endothermic reaction occurs to calcine said component and said preheated argillaceous component and said calcined calcareous component having a mutual sintering temperature at which said components sinter to begin to form a cement clinker; the method comprising the steps of:

a. supplying a flow of said calcareous component to said preheat stage of first heat exchanger and supplying a flow of said argillaceous component to said second heat exchanger;

b. supplying a first flow of a hot gas to said preheat stage and preheating said calcareous component with said gas;

c. passing said preheated flow of calcareous material to said calcining stage;

d. admitting a flow of a fuel to said calcining stage, a flow of a gas containing free oxygen and a second flow of a hot gas to said calcining stage;

e. combusting said fuel with said gas within said calcining stage to produce a hot product gas and further heating said preheated calcareous component with said product gas and said second flow of a hot gas until said endothermic process is substantially complete and reducing the temperature of said product gas and second flow of gas;

f. passing said further heated calcareous component to said superheating stage and admitting a flow of a fuel and a gas containing free oxygen to said superheating stage;

g. combusting said fuel with said gas within said superheating stage to produce a hot product gas and heating said calcined calcareous component with said hot product gas to a temperature not less than said sintering temperature;

h. discharging said calcareous component from said superheating stage and passing said product gas from said superheating stage;

i. supplying a third flow of a hot gas to said second heat exchanger and heating said argillaceous component with said third flow to a temperature less than said eutectic temperature; and j. discharging said heated argillaceous component from said second heat exchanger whereby said argillaceous component and said calcareous component may be blended and sintered to a cement clinker in said reactor with said reactor supplying only an additional amount of heat needed to augment the heat of said calcareous component to maintain a sintering reaction between said components.

2. A method according to claim 1, wherein said product gas passed from said superheating stage is said second flow of a hot gas admitted to said calcining stage.

3. A method according to claim 2, wherein at least a portion of said flow of waste gas from said cooler s passed to said calcining stage as said flow of gas containing free oxygen.

4. A method according to claim 3, wherein at least an additional portion of said flow of waste gas from said cooler is passed to said superheating stage as said flow of gas containing free oxygen.

5. A method according to claim 4, wherein a further remaining portion of said flow of waste gas from said cooler is passed to said second heat exchanger as said third flow of hot gas.

6. A method according to claim 5, comprising passing said reduced temperature gases from said calcining stage to said preheat stage as said first flow of hot gas.

7. A method according to claim 6, wherein said calcareous component comprises essentially limestone.

8. A method according to claim 7, wherein said calcareous component is heated to about 850° C. in said calcining stage.

9. A method according to claim 8, wherein said calcareous component is heated to about 1,200° C. in said superheating stage.

UNITED STATES PATENT OFFICE
CERTIFICATE OF CORRECTION

Patent No. 4,416,697    Dated November 22, 1983

Inventor(s) Steven J. Zagar and James L. Shy

It is certified that error appears in the above-identified patent and that said Letters Patent are hereby corrected as shown below:

Column 8, line 32, "s" should read --- is ---.

Signed and Sealed this

Twenty-eighth Day of February 1984

[SEAL]

Attest:

GERALD J. MOSSINGHOFF

Attesting Officer    Commissioner of Patents and Trademarks